(12) United States Patent
Van Zeijl et al.

(10) Patent No.: US 8,594,234 B2
(45) Date of Patent: Nov. 26, 2013

(54) MULTIPLE TRANSMISSION APPARATUS WITH REDUCED COUPLING

(75) Inventors: Paulus Thomas Maria Van Zeijl, Eindhoven (NL); David Benoit Didier Duperray, Redwood City, CA (US); Manel Collados Asensio, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 812 days.

(21) Appl. No.: 12/671,933

(22) PCT Filed: Aug. 4, 2008

(86) PCT No.: PCT/IB2008/053106
§ 371 (c)(1),
(2), (4) Date: Feb. 3, 2010

(87) PCT Pub. No.: WO2009/022254
PCT Pub. Date: Feb. 19, 2009

(65) Prior Publication Data
US 2011/0116567 A1 May 19, 2011

(30) Foreign Application Priority Data
Aug. 10, 2007 (EP) .................................. 07114133

(51) Int. Cl.
*H04L 27/00* (2006.01)
(52) U.S. Cl.
USPC .......................................... 375/299; 375/295
(58) Field of Classification Search
USPC .......................................................... 375/299
See application file for complete search history.

(56) References Cited

U.S. PATENT DOCUMENTS

| 5,552,732 | A | 9/1996 | Huang |
| 6,081,696 | A | 6/2000 | Wong |
| 6,466,803 | B1 * | 10/2002 | Gardner ...................... 455/553.1 |
| 6,640,091 | B1 * | 10/2003 | Shiraishi ........................ 455/118 |
| 2002/0097036 | A1 * | 7/2002 | Bradley ...................... 324/76.19 |
| 2002/0140869 | A1 * | 10/2002 | Carr et al. ....................... 348/726 |
| 2002/0159130 | A1 * | 10/2002 | Sakano et al. ................ 359/326 |
| 2003/0092414 | A1 * | 5/2003 | Shi et al. ......................... 455/260 |
| 2004/0121753 | A1 | 6/2004 | Sugar et al. |
| 2004/0212417 | A1 * | 10/2004 | Behzad ........................... 327/363 |
| 2005/0064892 | A1 | 3/2005 | Cavin |
| 2006/0234649 | A1 | 10/2006 | Okada |
| 2007/0099582 | A1 * | 5/2007 | Chen et al. ....................... 455/76 |
| 2008/0284635 | A1 * | 11/2008 | Blatz et al. ..................... 341/158 |
| 2010/0317300 | A1 * | 12/2010 | Behzad ............................ 455/77 |

FOREIGN PATENT DOCUMENTS

| EP | 1213840 A1 | 6/2002 |
| EP | 1503509 A1 | 2/2005 |
| GB | 2424552 A2 | 9/2006 |
| JP | 01037139 A | 2/1989 |

* cited by examiner

*Primary Examiner* — Erin File

(57) ABSTRACT

The present invention relates to a transmission apparatus having at least two transmission branches for transmitting respective transmission signals at substantially same frequencies, and to a method of controlling such a transmission apparatus. A first oscillator circuit (62) is provided for generating a first signal at a first frequency to be used in a first transmission branch. Additionally, a second oscillator circuit (64) is provided for generating a second signal at a second frequency to be used in a second transmission branch, the second frequency being different from the first frequency. To enable transmission of the transmission signals at said substantially same frequencies, at least one frequency divider or multiplier (72, 74) is provided for dividing or respectively multiplying at least one of said first and second frequencies by a respective predetermined factor. Thereby, the first and second oscillator circuits can be operated at different frequencies, so that mutual coupling can be reduced.

10 Claims, 2 Drawing Sheets

MULTIPLE TRANSMISSION APPARATUS WITH REDUCED COUPLING

FIELD OF THE INVENTION

The present invention relates to a transmission apparatus, such as a multiple input multiple output (MIMO) transmitter, receiver or transceiver, having at least two transmission branches for transmitting respective transmission signals at substantially same frequencies.

BACKGROUND OF THE INVENTION

Multiple transmit (Tx) and multiple receive (Rx) systems have received considerable attention in recent years as they offer substantial capacity improvements over conventional single-input single-output (SISO) systems. They have been proposed to achieve higher data rates, e.g. in wireless communication systems, with no penalty in either power or bandwidth. Multiple transmit (Tx) and multiple receive (Rx) antenna systems are referred to as multiple input multiple output (MIMO) systems.

FIG. 1 shows a schematic block diagram of a conventional Cartesian transmitter device, wherein digital I- and Q-data output by a digital processing unit or the like are digital-to-analog (DA) converted at respective digital-to-analog converters (DACs) 12, 14, low-pass filtered at respective low-pass filters (LPF) 22, 24 (which may be tunable by a tuning signal), and up-converted by respective I- and Q-mixers 32, 34. At radio frequency (RF) level the up-converted I- and Q-streams are combined by a combining element 38 (e.g. an adder circuit or the like) and amplified by a power amplifier (PA) 40 before radiated at an antenna 50.

In the architecture of FIG. 1, I- and Q-signal are thus converted from digital to analog signals, low-pass filtered to remove alias components, and mixed with I- and Q-LO (local oscillator) signals in a single transmission path, branch, or chain. After addition and amplification the signal is radiated at the antenna 50.

Based on such a Cartesian transmitter a dual transmit architecture (e.g. 2*TX MIMO) can be realized by adding another transmission path, branch, or chain, which then consists of two more DACs, LPFs, mixers, and another PA. A voltage controlled oscillator (VCO) and/or a phase locked loop (PLL) circuit (not shown in FIG. 1) provided for generating the I- and Q-LO signals can be re-used, as the Tx frequency for both transmitter chains is the same.

However, the Cartesian transmitter suffers from the disadvantage that is not the most power efficient architecture. Therefore, transmitter architectures have been investigated so as to provide a more efficient transmitter implementation.

FIG. 2 shows a polar transmitter architecture which has a higher efficiency than the above Cartesian transmitter architecture. The base-band information is now provided in the form of polar signals, i.e., an (instantaneous) amplitude signal r(t) and an (instantaneous) phase signal phi(t). By modulating an oscillator circuit 60 (e.g. a PLL/VCO circuit) with the phase component, and adding the amplitude component somewhere else in the RF transmission path, branch, or chain, e.g. by controlling a PA 42, a (data-) modulated signal can be radiated at the antenna 50. The envelope and phase information can be derived from the I- and Q-signal by the following equations:

$$r(t)=\text{sqrt}[s_i^2(t)+s_q^2(t)] \text{ and} \quad (1)$$

$$phi(t)=\tan^{-1}[s_q(t)/s_i(t)] \quad (2)$$

Thus, a dual-transmit polar transmitter (e.g. a 2*TX MIMO polar transmitter) comprises two transmission paths, branches, or chains with two oscillators (e.g. VCO/PLLs) and two amplitude modulators. As the two transmission frequencies are the same, while the modulation at the first oscillator may be completely different from the modulation at the second oscillator, the instantaneous frequencies of the oscillators can be very close together. When these two oscillators are integrated on the same silicon die, coupling between the two oscillators will be present, and may cause huge problems. The signal from the first oscillator may be coupled into the second oscillator and vice-versa. Consequently, requirements concerning error vector magnitude (EVM) and adjacent coupled power ration (ACPR) may not be reached.

SUMMARY OF THE INVENTION

It is therefore an object of the present invention to provide an improved multi Tx/Rx system with reduced oscillator coupling.

This object is achieved by a transmission apparatus as claimed in claim 1 and by a method as claimed in claim 10.

Accordingly, oscillator circuits in multi-Tx transmission systems can be operated at different frequencies, so that their mutual coupling can be reduced. More specifically, different frequencies can be used for VCOs/PLLs in each transmitter (e.g. polar transmitter), thus minimizing the possibility or amount of coupling between the multiple VCOs/PLLs. This provides an advantageous solution to crosstalk issues arising when two polar transmitters or other multi-Tx transmitters are implemented on one silicon die, e.g., for multiple-input-multiple-output (MIMO) transmitters or LINC (linear amplification with non-linear components (LINC) transmitters.

According to a specific non-limiting embodiment, the at least one frequency divider or multiplier may comprise a first divider arranged in the first transmission branch and a second divider arranged in the second transmission branch, wherein the ratio between the first and second frequencies corresponds to the ratio between a respective predetermined factor of the first divider and a respective predetermined factor of the second divider. Thereby, the oscillator circuits of the transmission branches can be set to individual desired frequencies. As an example, the respective predetermined factor of the first divider may be 2 and the respective predetermined factor of the second divider may be 1.5. Of course, various other dividing or multiplying factors can be used based on desired oscillator frequencies. Not every transmission branch requires a frequency divider or multiplier, wherein the absence of a frequency multiplier or divider corresponds to a factor of 1.

In a transmitter part of the apparatus, at least one of the transmission signals may be generated from an output signal of the at least one divider or multiplier. Here, the respective oscillator circuit can be directly used as modulator for generating the transmission signal. This enables implementation with little circuit modifications.

As an additional option, the generated signals can be used in a receiver part of the apparatus. Then, the output signal of the at least one divider or multiplier is used as a local oscillator signal of a reception branch. Hence, also a solution for a dual-receiver, as also required in MIMO, is advantageously provided. In this case, one of the first and second transmission branches, which one is not related to said output signal, may be switched off when data is received.

Additionally, at least one corrector unit may be provided for correcting modulation data of the transmission signals in accordance with the respective predetermined factor. Impacts of the division or multiplication on the modulation index can thus be reduced.

Further modifications of the embodiments may be gathered from the dependent claims.

BRIEF DESCRIPTION OF THE DRAWINGS

The present invention will now be described based on embodiments with reference to the accompanying drawings, in which.

DETAILED DESCRIPTION OF EMBODIMENTS

In the following, a preferred embodiment will be described based on dual Tx polar transmitter architecture, which embodiment can be implemented in a MIMO system or a LINC (Linear amplification with Non-linear Components) system.

Figure 1:
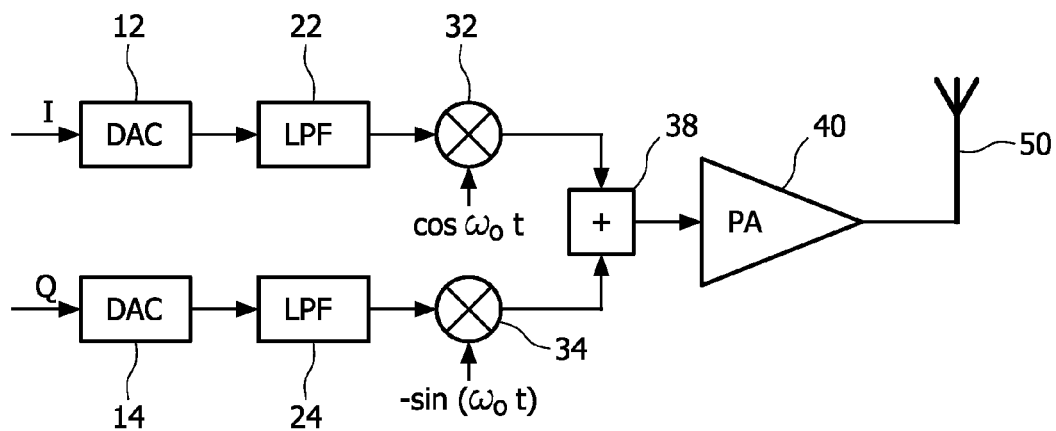
FIG. 1 shows a schematic block diagram of a conventional Cartesian transmitter architecture.
Figure 2:
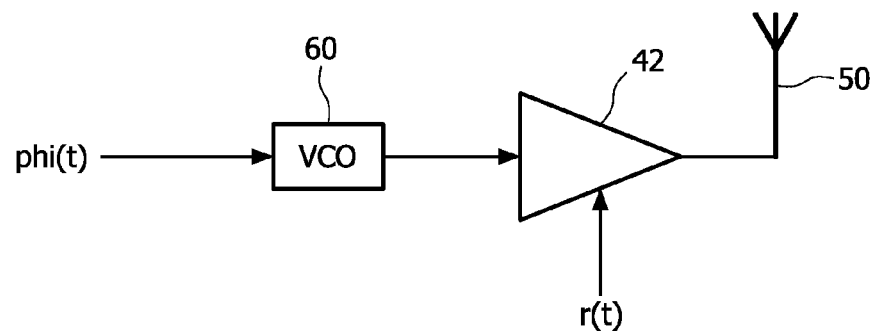
FIG. 2 shows a schematic block diagram of a conventional polar transmitter architecture.
Figure 3:
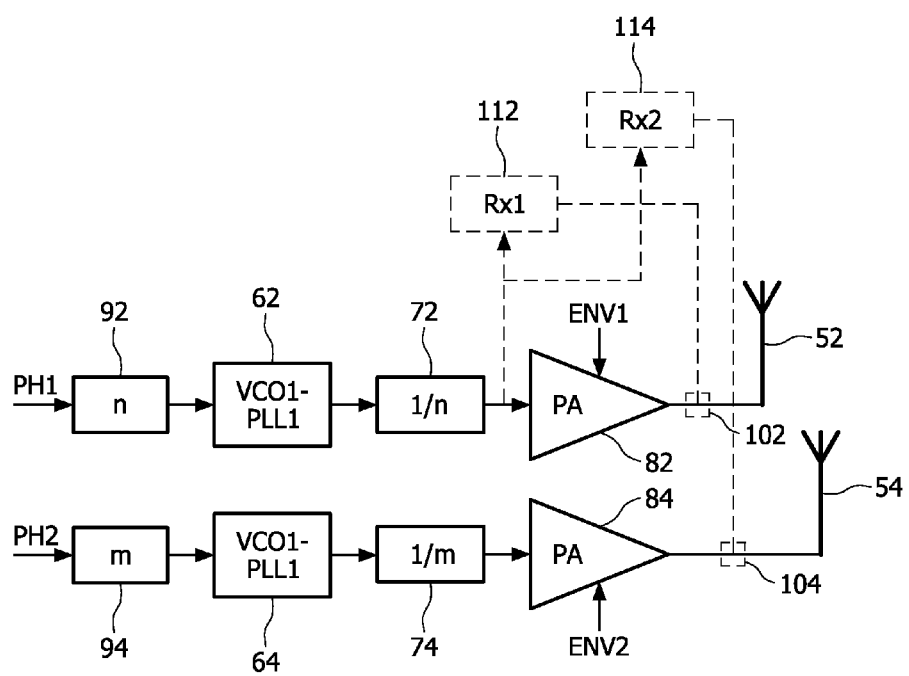
FIG. 3 shows a schematic block diagram of a dual Tx polar transmitter architecture according to the preferred embodiment.

FIG. 3 shows a schematic block diagram of a polar transmitter architecture according to the preferred embodiment.

Different frequencies are used for VCOs/PLLs 62, 64 in each polar transmitter path, branch, or chain, thus minimizing the possibility for coupling between the multiple VCOs/PLLs. At the same time a solution is presented for using the best solution for a dual-receiver which may also be required in transceiver systems (e.g. MIMO) comprising both transmitter and receiver parts.

In the upper path, branch, or chain of FIG. 3, PH1-data denotes the phase information of a first polar transmitter. It is passed through a first correction stage 92 and used as modulation input for a first controllable oscillator circuit (e.g. VCO1/PLL1) 62 operated as a phase modulator. After a divide-by-n circuit 72 a first PA 82 is driven with the phase-modulated signal to realize a first transmission chain. The first PA 82 itself has a second control input to which ENV1-data are supplied, denoting the polar envelope data associated with the polar phase data PH1. The second control input of the first PA 82 may be adapted to control the amplification of the first PA 82, so as to generate an additional amplitude modulation. The output of the first PA 82 is supplied to a first antenna 52.

In a second path, branch, or chain, PH2-data (corrected via a second correction stage 94) and ENV2-data modulate a second controllable oscillator circuit (e.g. VCO2/PLL2) 64 operated as a phase modulator and a second PA2 84, respectively, to realize a second transmission chain. Here, the frequency of the output signal of the second oscillator circuit 64 is corrected or changed in a divide-by-m circuit 74 before being supplied to the second PA 84. The output signal of the second PA 84 is supplied to a second antenna 54.

According to a non-limiting example for the case n=2 and m=1.5, it is assumed that the transmit antenna signal has a frequency fa=5 GHz. This requires the first oscillator circuit (VCO1/PLL1) to run at a frequency f1=10 GHz, since it will be divided by n=2 in the divide-by-n circuit 72. The second oscillator circuit (VCO2/PLL2) 64 will then have to run at a frequency f2=7.5 GHz, since it will be divided by m=1.5 in the divide-by-m circuit 74. As these two frequencies are far apart, the risk of injecting signals and coupling signals between the first and second oscillator circuits 62, 64 (e.g. one VCO/PLL combination into the other and vice-versa) will be reduced substantially.

In general the relation between the frequencies and dividing factors can be expressed as follows:

$$f1/n = f2/m = fa \quad (3)$$

It is noted that the frequency at the antennas 52, 54 could as well be larger than the oscillator frequencies. In this case the factors n and m would be less then 1, and the frequency dividing circuits 72, 74 would have to be replaced by frequency multiplying circuits. In general, the circuits 72, 72 can be implemented based on any type of conventional dividing or multiplying circuits known in the art.

However, due to the dividing or multiplying behavior (e.g. divide-by-n in the first chain and divide-by-m in the second chain), the phase modulation is reduced. Therefore, the PH1-data and the PH2-data need to be corrected in the correction stages 92, 94 by the same amount as the dividers 72, 74 will reduce it later on. For the first transmission chain, the correction can be expressed as follows:

$$PH1\text{-data}(t) = 2 * \tan^{-1}[s_{q1}(t)/s_{i1}(t)]. \quad (4)$$

A similar equation holds for the PH2-data:

$$PH2\text{-data}(t) = 1.5 * \tan^{-1}[s_{q2}(t)/s_{i2}(t)]. \quad (5)$$

In equations (2) and (3) $s_{q1}(t)/s_{q2}(t)$ denote the quadrature components of the respective oscillator signals, and $s_{i1}(t)/s_{i2}(t)$ denote the in-phase components of the respective oscillator signals.

Further details concerning implementation of a divide-by-1.5 can be gathered for example from the U.S. Pat. No. 5,552,732.

Various other combinations of frequencies are of course also possible. For instance, the second oscillator circuit (VCO2/PLL2) 64 may run at a frequency f2=15 GHz, and by use of a divide-by-m circuit 74 with m=3, results in a transmit signal with fa=5 GHz. Alternatively, the second oscillator circuit (VCO2/PLL2) may run at 12.5 GHz, thus needing a divide-by-m circuit 74 with m=2.5.

If an additional receiver part is provided, the optional (MIMO) receiver may comprise two receiver chains 112, 114, branched off via respective Rx/Tx switches 102, 104 for selectively switching the antennas 52 and 54 to the receiver chains 112, 114 in a receiver mode and to the transmitter chains in a transmitter mode. Each of the receiver chains 112, 114 has its own front-end, down-conversion mixers and IF-sections, demodulation etc (not shown). The I- and Q-output signal of the divide-by-n circuit 72 of FIG. 3 can then be used as LO-signals for the two receiver chains 112, 114, as indicated by the dashed portions in FIG. 3. The second transmission chain (comprising the second oscillator 64 (e.g. VCO2/PLL2), divide-by-m circuit 74, etc) can be switched off when data is received.

The preferred embodiment as described above can also be extended to a 3*3 MIMO with three transmission chains, or in general to an n*n MIMO with n transmission chains. For the example of three transmission chains, the frequency planning could be to use a divide-by-2 circuit 72 after the first oscillator circuit 62 of FIG. 3, a divide-by-1.5 circuit 74 after the second oscillator circuit 64, and no division for a third transmission chain with a the third oscillator circuit (not shown).

It is noted that the present invention is not restricted to the above specific examples and can be used in all possible wireless and wired standards (CDMA, EDGE, WLAN 802.11a/b/g, 802.16, BT-EDR, etc) that require efficient transmission of signals in combination with multi-Tx systems (e.g. MIMO, and reducing possible risks of coupling of multiple on-chip oscillators and/or PLLs. Moreover, the present invention can be implemented in LINC transmitters in which an original signal is decomposed into two constant amplitude envelope, phase varying signals, which, when combined, constructively and destructively interfere to re-form the original signal.

To summarize, a transmission apparatus having at least two transmission branches for transmitting respective transmission signals at substantially same frequencies, and a method of controlling such a transmission apparatus have been described. A first oscillator circuit 62 is provided for generating a first signal at a first frequency to be used in a first transmission branch. Additionally, a second oscillator circuit 64 is provided for generating a second signal at a second frequency to be used in a second transmission branch, the second frequency being different from the first frequency. To enable transmission of the transmission signals at said substantially same frequencies, at least one frequency divider or multiplier 72, 74 is provided for dividing or respectively multiplying at least one of said first and second frequencies by a respective predetermined factor. Thereby, the first and second oscillator circuits can be operated at different frequencies, so that mutual coupling can be reduced.

Finally but yet importantly, it is noted that the term "comprises" or "comprising" when used in the specification including the claims is intended to specify the presence of stated features, means, steps or components, but does not exclude the presence or addition of one or more other features, means, steps, components or group thereof. Further, the word "a" or "an" preceding an element in a claim does not exclude the presence of a plurality of such elements. Moreover, any reference sign does not limit the scope of the claims.

The invention claimed is:

1. A transmission apparatus having at least two transmission branches for transmitting respective transmission signals at substantially same frequencies, said apparatus comprising:
   a first transmission branch comprising:
      a first oscillator circuit for generating a first signal at a first frequency to be used in the first transmission branch; and
      a first frequency divider having a first predetermined factor, and a second transmission branch comprising:
      a second oscillator circuit for generating a second signal at a second frequency to be used in the second transmission branch, said second frequency being different from said first frequency; and
      a second frequency divider circuit having a second predetermined factor;
   wherein a ratio between the predetermined factor of the first frequency divider and the predetermined factor of the second frequency divider corresponds to the ratio between the first and second frequencies.

2. An apparatus according to claim 1, wherein said at least one frequency divider or multiplier comprises a first divider arranged in said first transmission branch and a second divider arranged in said second transmission branch, and wherein the ratio between said first and second frequencies corresponds to the ratio between a respective predetermined factor of said first divider and a respective predetermined factor of said second divider.

3. An apparatus according to claim 2, wherein said respective predetermined factor of said first divider is 2 and said respective predetermined factor of said second divider is 1.5.

4. An apparatus according to claim 1, wherein at least one of said transmission signals is generated from an output signal of said at least one divider or multiplier.

5. An apparatus according to claim 1, wherein an output signal of said at least one divider or multiplier is used as a local oscillator signal of a reception branch.

6. An apparatus according to claim 5, wherein said apparatus is adapted to switch off one of said first and second transmission branches, which one is not related to said output signal, when data is received.

7. An apparatus according to claim 1, further comprising at least one corrector unit for correcting modulation data of said transmission signals in accordance with said respective predetermined factor.

8. An apparatus according to claim 7, wherein said apparatus comprises a multiple input multiple output transmitter.

9. An apparatus according to claim 7, wherein said apparatus comprises a linear amplification with non-linear components transmitter.

10. A method of operating a transmission apparatus having at least two transmission branches for transmitting respective transmission signals at substantially same frequencies, said apparatus comprising the steps of:
   a) generating a first signal, by a first oscillator circuit in a first transmission branch, at a first frequency to be used in said first transmission branch;
   b) generating a second signal, by a second oscillator circuit in a second transmission branch, at a second frequency to be used in said second transmission branch, said second frequency being different from said first frequency; and
   c) dividing or multiplying at least one of said first and second frequencies by a respective predetermined factor, so as to enable transmission of said transmission signals at said substantially same frequencies.

* * * * *